US012596980B2

(12) United States Patent
Fu

(10) Patent No.: US 12,596,980 B2
(45) Date of Patent: Apr. 7, 2026

(54) INSPECTION SYSTEM AND INSPECTION METHOD FOR BUILDING COMPONENTS OF BUILDING STRUCTURES BASED ON COMMON DATA ENVIRONMENT AND BUILDING INFORMATION MODELING

(71) Applicant: LEE MING CONSTRUCTION CO., LTD., Taichung (TW)

(72) Inventor: Hsuan-Wei Fu, New Taipei (TW)

(73) Assignee: LEE MING CONSTRUCTION CO., LTD., Taichung City (TW)

( * ) Notice: Subject to any disclaimer, the term of this patent is extended or adjusted under 35 U.S.C. 154(b) by 146 days.

(21) Appl. No.: 18/477,547

(22) Filed: Sep. 28, 2023

(65) Prior Publication Data

US 2025/0111314 A1 Apr. 3, 2025

(51) Int. Cl.
G06Q 10/0635 (2023.01)
(52) U.S. Cl.
CPC ................................. G06Q 10/0635 (2013.01)
(58) Field of Classification Search
CPC .................................................. G06Q 10/0635
USPC ........................................................ 705/7.28
See application file for complete search history.

(56) References Cited

U.S. PATENT DOCUMENTS

| | | | | |
|---|---|---|---|---|
| 7,191,141 | B2 * | 3/2007 | Motoyama ............. | G06Q 10/06 |
| | | | | 705/7.17 |
| 11,934,744 | B2 * | 3/2024 | Williams ................ | G06F 30/13 |
| 12,216,964 | B2 * | 2/2025 | Luciani .............. | G06Q 10/0635 |
| 2002/0129001 | A1 * | 9/2002 | Levkoff .................. | G06F 30/13 |

(Continued)

FOREIGN PATENT DOCUMENTS

| | | | |
|---|---|---|---|
| CN | 203720889 U | * | 7/2014 |
| CN | 104680322 A | | 6/2015 |

(Continued)

OTHER PUBLICATIONS

Search Report for TW112127978, Issued on May 26, 2024, Total of 2 pages.

(Continued)

*Primary Examiner* — Abdallah A El-Hage Hassan
(74) *Attorney, Agent, or Firm* — Apex Juris, pllc; Hilde M. L. Coeckx

(57) ABSTRACT

An inspection system for building components of building structures includes a digital environment integration platform based on Common Data Environment and storing several inspection floor pages of a building structure, a server, and a mobile device. The inspection floor pages are created based on Building Information Modeling and respectively have several building component link points respectively linked to configuration data of a building component and an inspection form, which complies with ISO 19650 standards. An inspection method includes sending a floor selection command to the server through the mobile device; acquiring the corresponding inspection floor page from the digital environment integration platform and sending the corresponding inspection floor page to the mobile device by the server for displaying on a screen; displaying, by the mobile device, the configuration data and is linked to the inspection form when a user selects the building component link point displayed on the screen.

12 Claims, 12 Drawing Sheets

(56)             References Cited

U.S. PATENT DOCUMENTS

| | | | |
|---|---|---|---|
| 2005/0209897 A1 * | 9/2005 | Luhr .................. | G06Q 30/0201 |
| | | | 705/7.29 |
| 2012/0023435 A1 * | 1/2012 | Kneppers .............. | G06Q 90/00 |
| | | | 715/780 |
| 2012/0316930 A1 * | 12/2012 | Clemenson ........... | G06Q 10/06 |
| | | | 705/7.11 |
| 2014/0164072 A1 * | 6/2014 | Kulusjarvi .............. | G06F 30/13 |
| | | | 705/7.39 |
| 2017/0061342 A1 * | 3/2017 | LoRe .............. | G06Q 10/06393 |

FOREIGN PATENT DOCUMENTS

| | | | | | |
|---|---|---|---|---|---|
| CN | 111866734 A | * | 10/2020 | ............ | H04W 4/021 |
| CN | 112800751 A | * | 5/2021 | ........... | G06F 16/958 |
| CN | 119476327 A | * | 2/2025 | ....... | G06K 19/06037 |
| JP | 3483758 B2 | * | 1/2004 | | |
| JP | 2008197750 A | * | 8/2008 | | |
| KR | 20160066222 A | * | 6/2016 | ............ | G06Q 50/08 |
| TR | 201601862 A | * | 6/2016 | | |
| TW | M560099 U | | 5/2018 | | |
| TW | M650723 U | | 1/2024 | | |
| WO | WO-2019103408 A1 | * | 5/2019 | ............ | G06Q 50/00 |

OTHER PUBLICATIONS

English Abstract for CN104680322A, Total of 1 page.
English Abstract for TWM560099U, Total of 1 page.
English Abstract for TWM650723U, Total of 1 page.

* cited by examiner

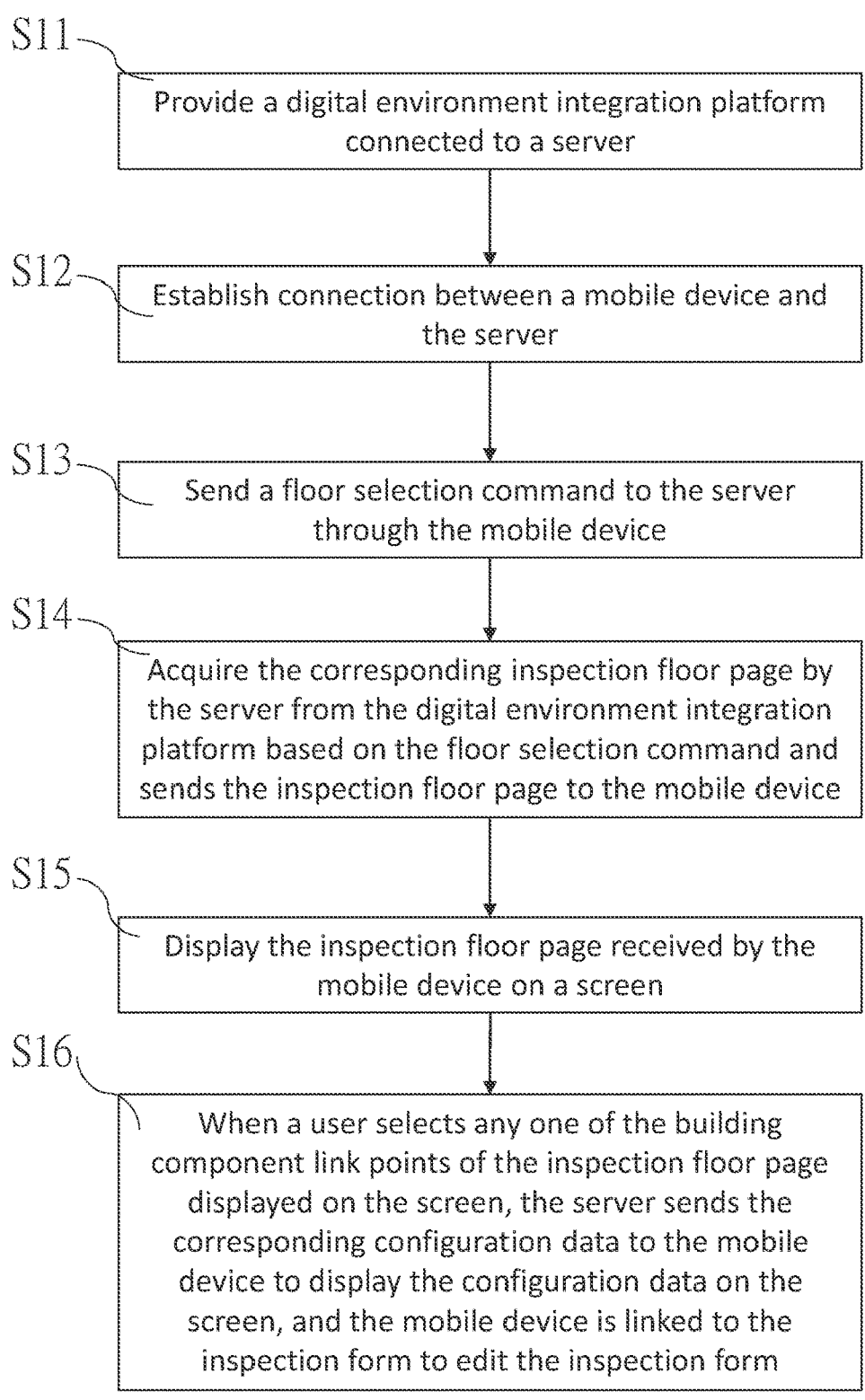

S11

Provide a digital environment integration platform connected to a server

S12

Establish connection between a mobile device and the server

S13

Send a floor selection command to the server through the mobile device

S14

Acquire the corresponding inspection floor page by the server from the digital environment integration platform based on the floor selection command and sends the inspection floor page to the mobile device

S15

Display the inspection floor page received by the mobile device on a screen

S16

When a user selects any one of the building component link points of the inspection floor page displayed on the screen, the server sends the corresponding configuration data to the mobile device to display the configuration data on the screen, and the mobile device is linked to the inspection form to edit the inspection form

INSPECTION SYSTEM AND INSPECTION METHOD FOR BUILDING COMPONENTS OF BUILDING STRUCTURES BASED ON COMMON DATA ENVIRONMENT AND BUILDING INFORMATION MODELING

BACKGROUND OF THE INVENTION

Technical Field

The present invention relates generally to an inspection of building structures, and more particularly to an inspection system and an inspection method for building components of building structures.

Description of Related Art

In the construction process, buildings must comply with building standards to ensure the safety of the buildings constructed. A building structure of a building includes numerous building components, which need to be inspected in detail.

Taking beams and columns as examples, configurations of reinforcement bars of the beams and the columns affect the strength of the building. If the quantity of the reinforcement bars in the beams or the columns is insufficient or if the reinforcement bars are improperly tied, the strength of the beams or the columns would become inadequate. Therefore, in the construction industry, the configurations of the reinforcement bars of the beams and the columns are a key focus in the inspection process.

A conventional inspection method for the reinforcement bars involves inspectors carrying configuration data and inspection forms of the beams or the columns, which are about to be inspected, of the building structure to a construction site, wherein all the configuration data and the inspection forms are in a paper format.

The inspectors inspect the configurations of the reinforcement bars of the beams or the columns individually at the construction site and compare and verify the configuration of the reinforcement bars with the paper configuration data. When completing the verification, the inspectors record verified details on the paper inspection forms. However, paperwork is inconvenient for the inspectors, especially when carrying a large number of the configuration data and the inspection forms of the beams and the columns, which easily leads to operational omissions or errors in filling out the configuration data and the inspection forms.

Therefore, the conventional inspection method for building components of building structures still has room for improvement.

BRIEF SUMMARY OF THE INVENTION

In view of the above, the primary objective of the present invention is to provide an inspection system and an inspection method for building components of building structures, which could effectively streamline the inspection process for the building components.

The present invention provides an inspection system for building components of building structures, including a digital environment integration platform, a server, and a mobile device.

The digital environment integration platform stores a plurality of inspection floor pages of at least one building structure. Each of the plurality of inspection floor pages has a floor plan and a plurality of building component link points. Each of the plurality of building component link points is configured to be linked to configuration data of one building component and an inspection form corresponding to the building component.

The server is connected to the digital environment integration platform.

The mobile device is connected to the server and has a screen.

When the mobile device sends a floor selection command corresponding to one of the plurality of inspection floor pages to the server. The server acquires the corresponding inspection floor page from the digital environment integration platform based on the floor selection command and sends the corresponding inspection floor page to the mobile device. The mobile device displays the inspection floor page received on the screen.

When a user selects any one of the plurality of building component link points of the inspection floor page displayed on the screen, the server sends the configuration data corresponding to the building component link point to the mobile device, so that the configuration data corresponding to the building component link point is displayed on the screen of the mobile device, and the mobile device is linked to the inspection form corresponding to the building component link point to edit the inspection form.

The present invention further provides an inspection method for building components of building structures, including steps of:

providing a digital environment integration platform which stores a plurality of inspection floor pages of at least one building structure; wherein each of the plurality of inspection floor pages has a floor plan and a plurality of building component link points; each of the plurality of building component link points is configured to be linked to configuration data of a building component and an inspection form corresponding to the building component; the digital environment integration platform is connected to a server;

establishing a connection between a mobile device and the server;

sending a floor selection command to the server through the mobile device, wherein the floor selection command corresponds to one of the plurality of inspection floor pages;

acquiring the corresponding inspection floor page from the digital environment integration platform by the server based on the floor selection command and sending the corresponding inspection floor page to the mobile device by the server;

displaying, by the mobile device, the inspection floor page received by the mobile device on a screen of the mobile device; and sending the configuration data corresponding to one of the plurality of building component link point to the mobile device by the server when a user selects the building component link point of the inspection floor page displayed on the screen, so that the configuration data corresponding to the building component link point selected is displayed on the screen of the mobile device, and the mobile device is linked to the inspection form to edit the inspection form.

With the aforementioned design, the user could perform the inspection for the configurations of the building components in the building structures by only carrying the mobile device, so that the problem of the conventional inspection method for the building components that requires to bring all the paper configuration data and paper inspection forms corresponding to the building components of the building structures could be resolved, thereby effectively streamlining the inspection process for building components.

BRIEF DESCRIPTION OF THE SEVERAL VIEWS OF THE DRAWINGS

The present invention will be best understood by referring to the following detailed description of some illustrative embodiments in conjunction with the accompanying drawings, in which

FIG. 2 is a flow chart of the inspection method for the building components of the building structures according to the first embodiment of the present invention;

DETAILED DESCRIPTION OF THE INVENTION

Figure 1:
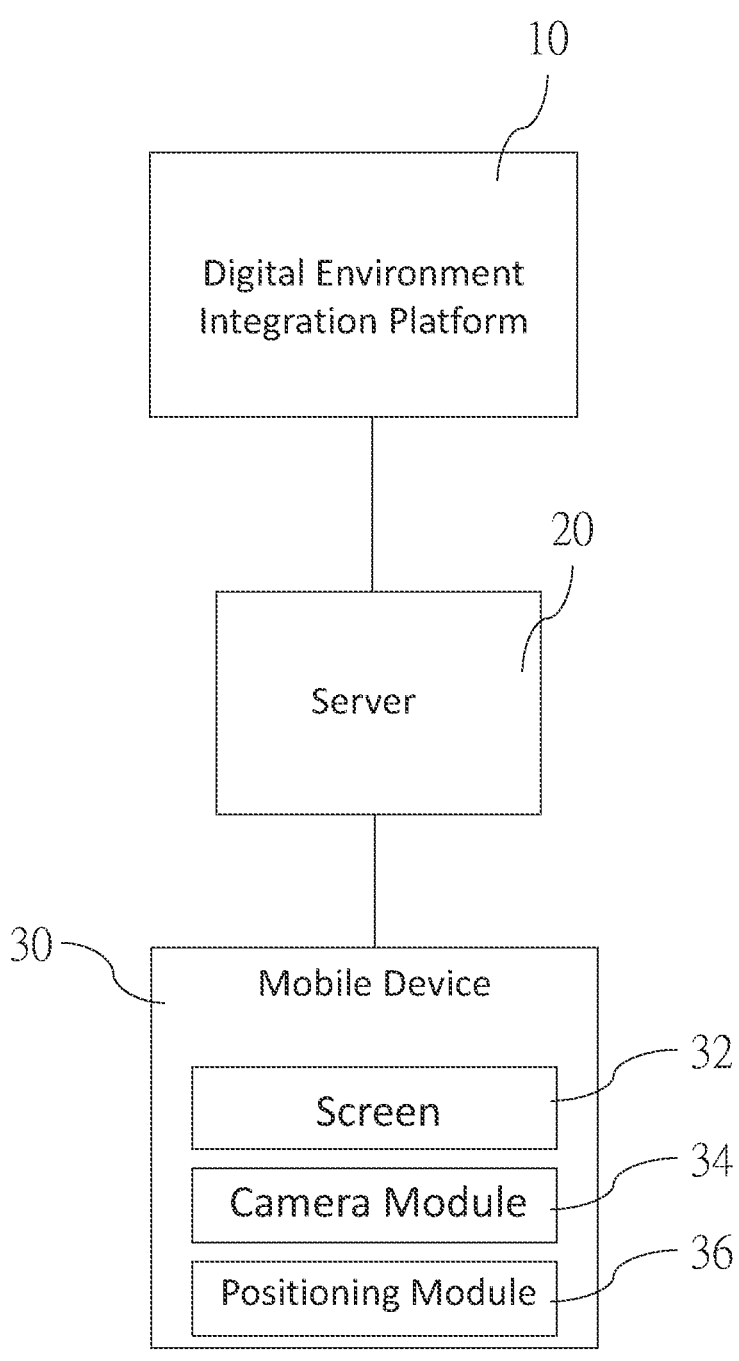
FIG. 1 is a schematic view of the inspection system for the building components of the building structures according to a first embodiment of the present invention.

An inspection system for building components of building structures according to a first embodiment of the present invention is shown in FIG. 1 and includes a digital environment integration platform 10, a server 20, and a mobile device 30. The inspection system is configured to perform an inspection method for building components of building structures in the current embodiment, wherein the method includes steps S11 to S16 as shown in FIG. 2. The inspection system for the building components of the building structures and the inspection method for the building components of the building structures will be described as below.

Figure 3:
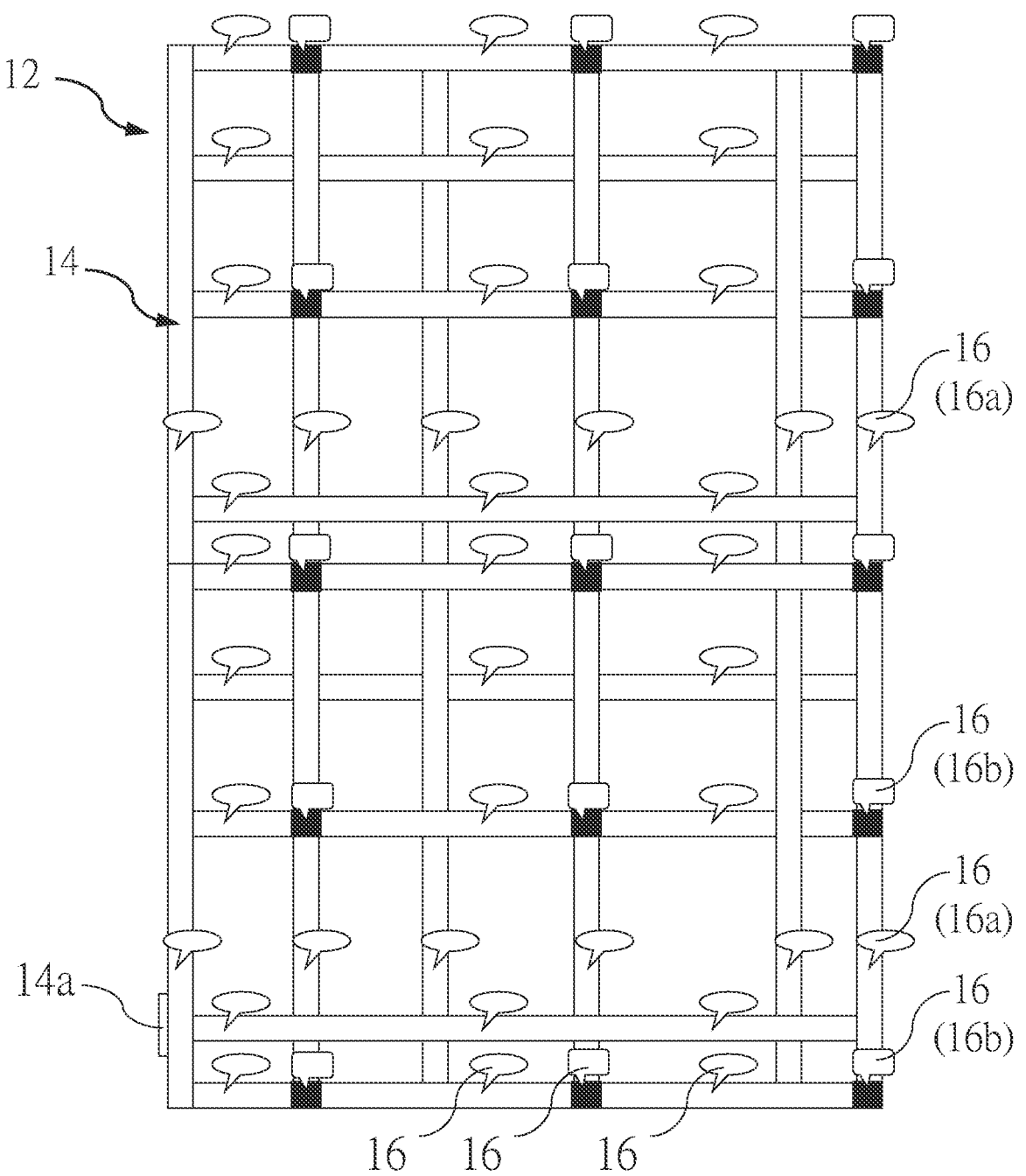
FIG. 3 is a schematic view of the inspection floor page according to the first embodiment of the present invention.
Figure 4:
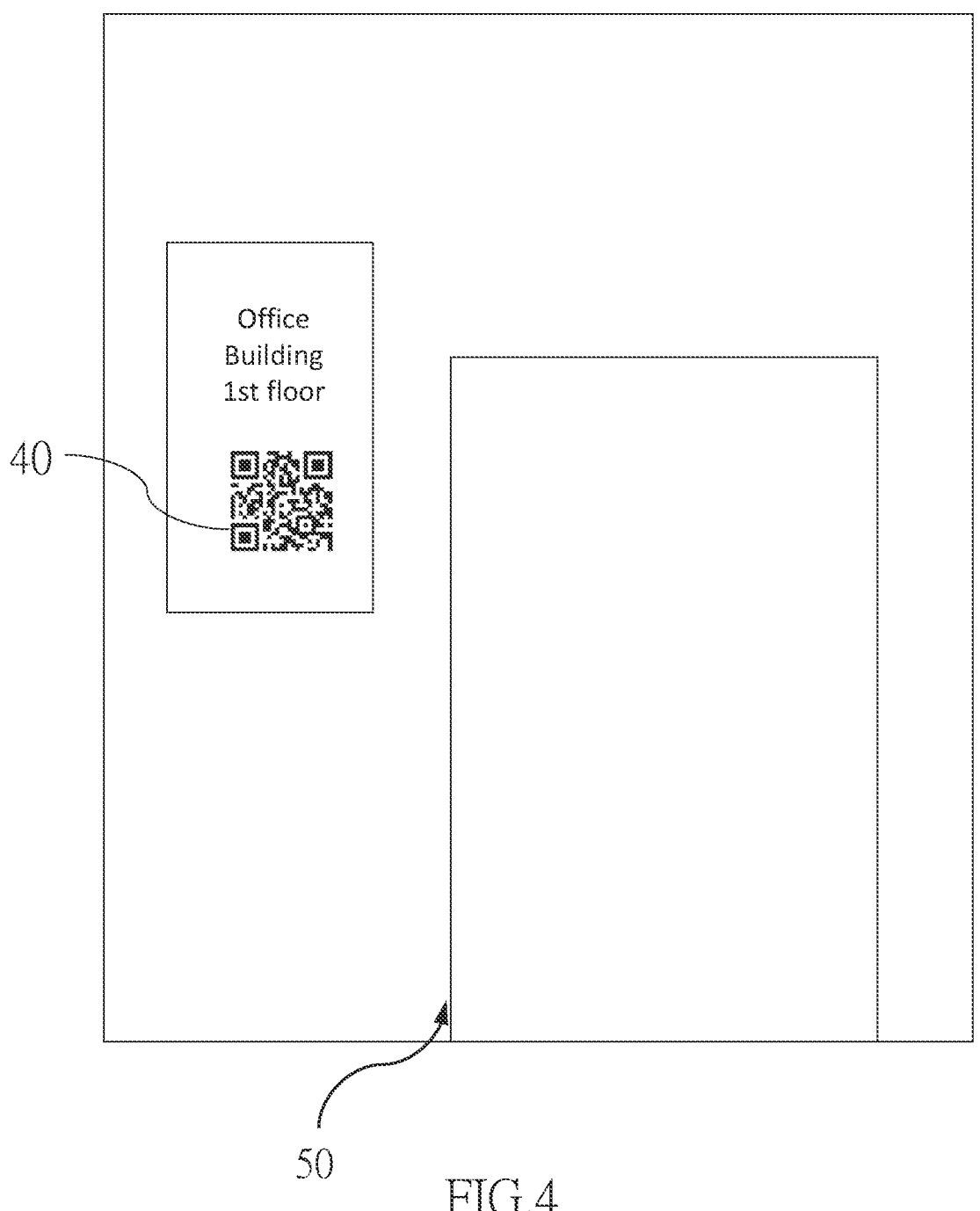
FIG. 4 is a schematic view showing that the two-dimensional code is disposed at the entrance of the floor.

The digital environment integration platform 10 is based on the Common Data Environment (CDE). The digital environment integration platform 10 could, for example, be a database or a cloud storage accessible for relevant participants to connect and access. The digital environment integration platform 10 stores a plurality of inspection floor pages 12 of at least one building structure, wherein the inspection floor pages 12 are created based on Building Information Modeling (BIM). One of the inspection floor pages 12 is shown in FIG. 3. Each of the inspection floor pages 12 has a floor plan 14 and a plurality of building component link points 16. Each of the building component link points 16 is configured to be linked to configuration data of a building component and an inspection form corresponding to the building component. Each of the configuration data is in an electronic file form. The configuration data could be stored in the digital environment integration platform 10, but not limited thereto; the configuration data could also be stored in a cloud storage. In practice, the digital environment integration platform 10 could be developed by using Unity, and the Building Information Modeling could be developed by using Revit. In the current embodiment, the at least one building structure includes a plurality of building structures, but not limited thereto; the number of the building structure could be one or plural.

In the current embodiment, each of the building components is a beam or a column as an example, and the configuration data of the building components could be reinforcement bar configuration diagrams, but not limited thereto. The configuration data of the beam could include beam reinforcement bar configuration diagrams, dimensions (beam width, beam depth), layout point positions, beam bottom elevations, drop beam positions, drop beam elevations, or a combination thereof. The configuration data of the column could include column reinforcement bar configuration diagrams, dimensions (column width, column depth), layout point positions, or a combination thereof. In an embodiment, each of the building components could be a floor slab, and the configuration data of the floor slab could include dimensions (slab thickness), opening positions, drop slab positions, drop slab elevations, or a combination thereof. In an embodiment, each of the building components could be a wall, and the configuration data of the wall could include dimensions (wall thickness), opening positions, door and window openings, stone cutting diagrams, or a combination thereof.

As shown in FIG. 3, building component link points 16a of the beams and building component link points 16b of the columns are represented in different icons. In the current embodiment, the inspection form of each of the building components is in an electronic file form stored in the cloud storage, and each of the building component link points 16 is configured to be linked to the inspection form of one of the building components in the cloud storage, but not limited thereto; the inspection forms could also be stored in the digital environment integration platform 10. Each of the inspection forms complies with ISO 19650 standards.

The server 20 is connected to the digital environment integration platform 10 through, for example, the Internet. The server 20 is configured to access data in the digital environment integration platform 10. In practice, the digital environment integration platform 10 could also be integrated with the server 20 in a host. In practice, the server 20 could be developed by using GitHub.

The mobile device 30 is connected to the server 20. In the current embodiment, the mobile device 30 could be a device convenient for a user (such as an inspector) to carry and connect to the server 20 through the Internet, such as a smartphone, a tablet, a notebook, etc. The mobile device 30 has a screen 32, a camera module 34, and a positioning module 36. The screen 32 could be, for example, a touch screen.

The mobile device 30 executes an application software to be connected to the server 20, and then the user inputs an account and a password in the mobile device 30 to log in the server 20.

In the current embodiment, the inspection system for the building components of the building structures further includes a plurality of two-dimensional codes 40 respectively provided at entrances 50 of one of a plurality of floors of the at least one building structure, for example, posted at the entrances 50 to the floors. A content of each of the two-dimensional codes 40 is configured to be linked to the server 20. The user operates the mobile device 30 to scan any one of the two-dimensional codes 40, and the mobile device 30 then acquires the content of the two-dimensional code 40 through the camera module 34 to be connected to the server 20.

After establishing the connection between the mobile device 30 and the server 20, the user operates the mobile device 30 to select one of the floors to be inspected. A floor selection command is sent to the server 20 through the mobile device 30, wherein the floor selection command corresponds to one of the inspection floor pages 12, that is, the floor selection command corresponds to the selected floor.

Figure 5:
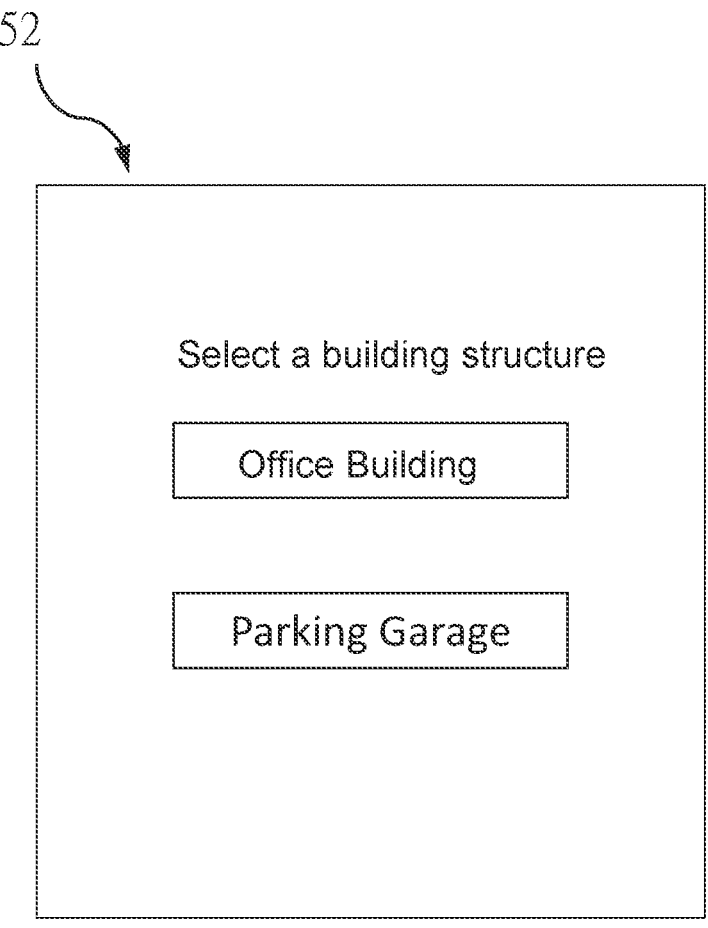
FIG. 5 is a schematic view of the building structure selection page according to the first embodiment of the present invention.
Figure 6:
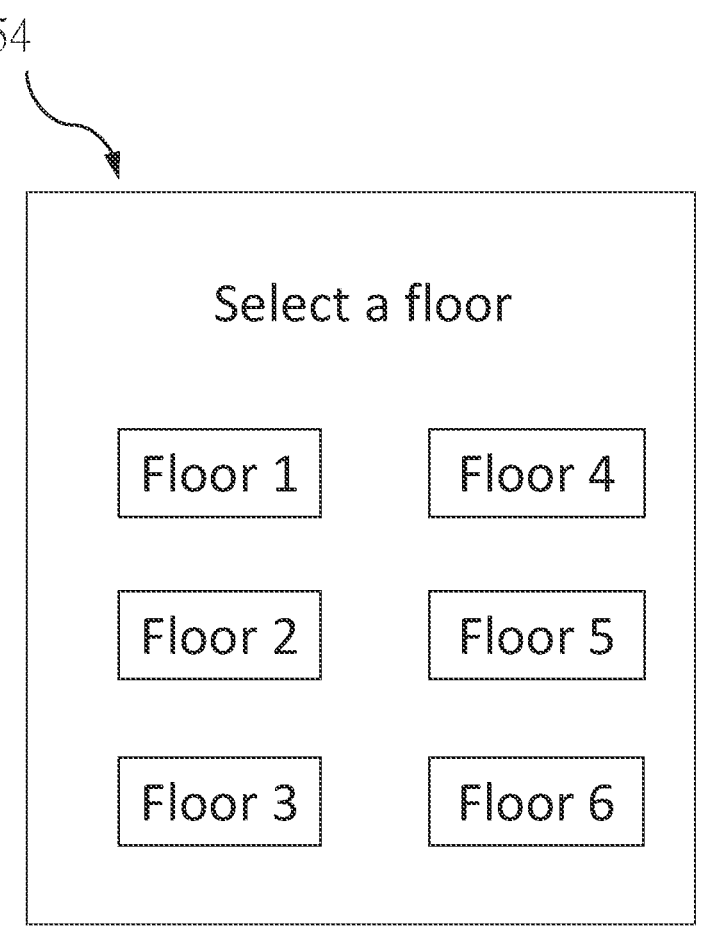
FIG. 6 is a schematic view of the floor selection page according to the first embodiment of the present invention.

In the current embodiment, after establishing the connection between the mobile device 30 and the server 20, the server 20 sends a building structure selection page 52 to the mobile device 30, and the mobile device 30 displays the building structure selection page 52 on the screen 32 (shown in FIG. 5). The user selects one of the building structures to be inspected, such as "Office Building", on the building structure selection page 52, and the mobile device 30 sends a building structure selection command to the server 20. Then, the server 20 sends a floor selection page 54 of the selected building structure to the mobile device 30, and the mobile device 30 displays the floor selection page 54 on the screen 32 (shown in FIG. 6). The user selects one of the floors to be inspected on the floor selection page 54, such as "First Floor", and the mobile device 30 sends the corresponding floor selection command to the server 20.

The server 20 acquires the corresponding inspection floor page 12 (shown in FIG. 3) from the digital environment integration platform 10 based on the floor selection command and sends the corresponding inspection floor page 12 to the mobile device 30.

The mobile device 30 displays the inspection floor page 12 received on the screen 32 of the mobile device 30.

When the user selects any one of the building component link points 16 of the inspection floor page 12 displayed on the screen 32, the server 20 sends the configuration data corresponding to the building component link point 16 selected to the mobile device 30, so that the configuration data corresponding to the building component like point selected is displayed on the screen 32 of the mobile device 30, and the mobile device 30 is linked to the inspection form corresponding to the building component link point 16 selected to edit the inspection form.

In the current embodiment, when the user selects one of the building component link points 16, the mobile device 30 sends a link command corresponding to the selected building component link point 16 to the server 20. Based on the selected building component link point 16 corresponding to the link command, the server 20 acquires the configuration data corresponding to the building component link point 16 from the digital environment integration platform 10 and sends the corresponding configuration data to the mobile device 30. In this way, the user could perform the inspection on configurations of the building components (such as beams or columns) of a construction site of the building structure in conjunction with the configuration data displayed on the screen 32 of the mobile device 30 and could record inspection results on the inspection form through the mobile device 30.

Additionally, in the current embodiment, user data of the user, such as a user name, an employee number, etc., could be input into the mobile device 30. When the inspection form is edited through the mobile device 30, the mobile device 30 automatically inputs the user data into the inspection form, thereby ensuring that the inspection form is filled out by the user.

In this way, the user could perform the inspection for the configurations of the building components of the building structures by only carrying the mobile device 30, resolving the problem of the conventional inspection method for building components of building structures that requires to bring all the paper configuration data and paper inspection forms corresponding to the building components of the building structures.

An inspection system and an inspection method for building components of building structures according to a second embodiment of the present invention will hereinafter be described, wherein the inspection system and the inspection method of the second embodiment are almost the same as that of the first embodiment, except that:

in the current embodiment, the content of each of the two-dimensional codes 40 further corresponds to one of the inspection floor pages 12; that is, the two-dimensional code 40 provided at the entrance 50 of each of the floors corresponds to the inspection floor page 12 of the floor; the server 20 has a corresponding relationship between the content of each of the two-dimensional codes 40 and each of the inspection floor pages 12; in other words, when the user scans the two-dimensional code 40 at the entrance 50 of the floor through the mobile device 30, the mobile device 30 forms the floor selection command through the content of the two-dimensional code 40 acquired by the camera module 34; the user is neither required to select the building structure to be inspected on the building structure selection page 52 nor required to select the floor to be inspected on the floor selection page 54, but the mobile device 30 is connected to the server 20 through the two-dimensional code 40 and directly specifies the floor to be inspected through the content of the two-dimensional code 40; the server 20 acquires the corresponding inspection floor page 12 from the digital environment integration platform 10 based on the content of the two-dimensional code 40 received and the corresponding relationship.

Figure 7:
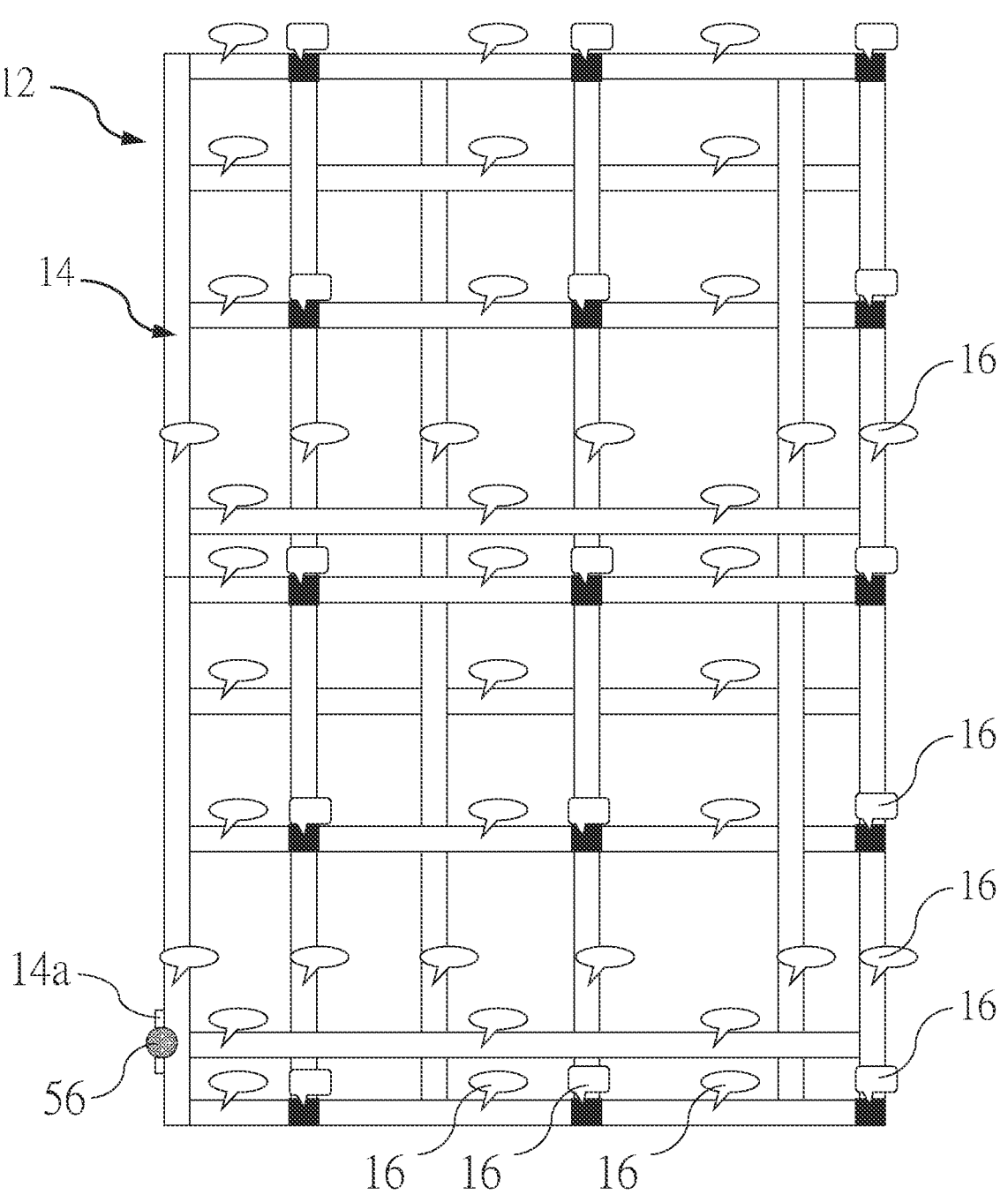
FIG. 7 is a schematic view of the inspection floor page displayed on the screen according to a second embodiment of the present invention.

Referring to FIG. 7, in the current embodiment, after the mobile device 30 acquires the inspection floor page 12, the mobile device 30 displays a positioning point 56 corresponding to the mobile device 30 at an entrance 14a on the floor plan 14 of the inspection floor page 12 displayed on the screen 32, so that the user could confirm a current location through the positioning point 56 displayed on the screen 32.

In the current embodiment, the positioning module 36 of the mobile device 30 is configured to acquire positioning data. For example, the positioning module 36 could acquire the positioning data through an indoor positioning device (not shown) disposed at the current floor; the indoor positioning device could use a wireless signal, such as WIFI or Bluetooth, for positioning; the mobile device 30 acquires the positioning data based on the wireless signal received by the positioning module 36.

Figure 8:
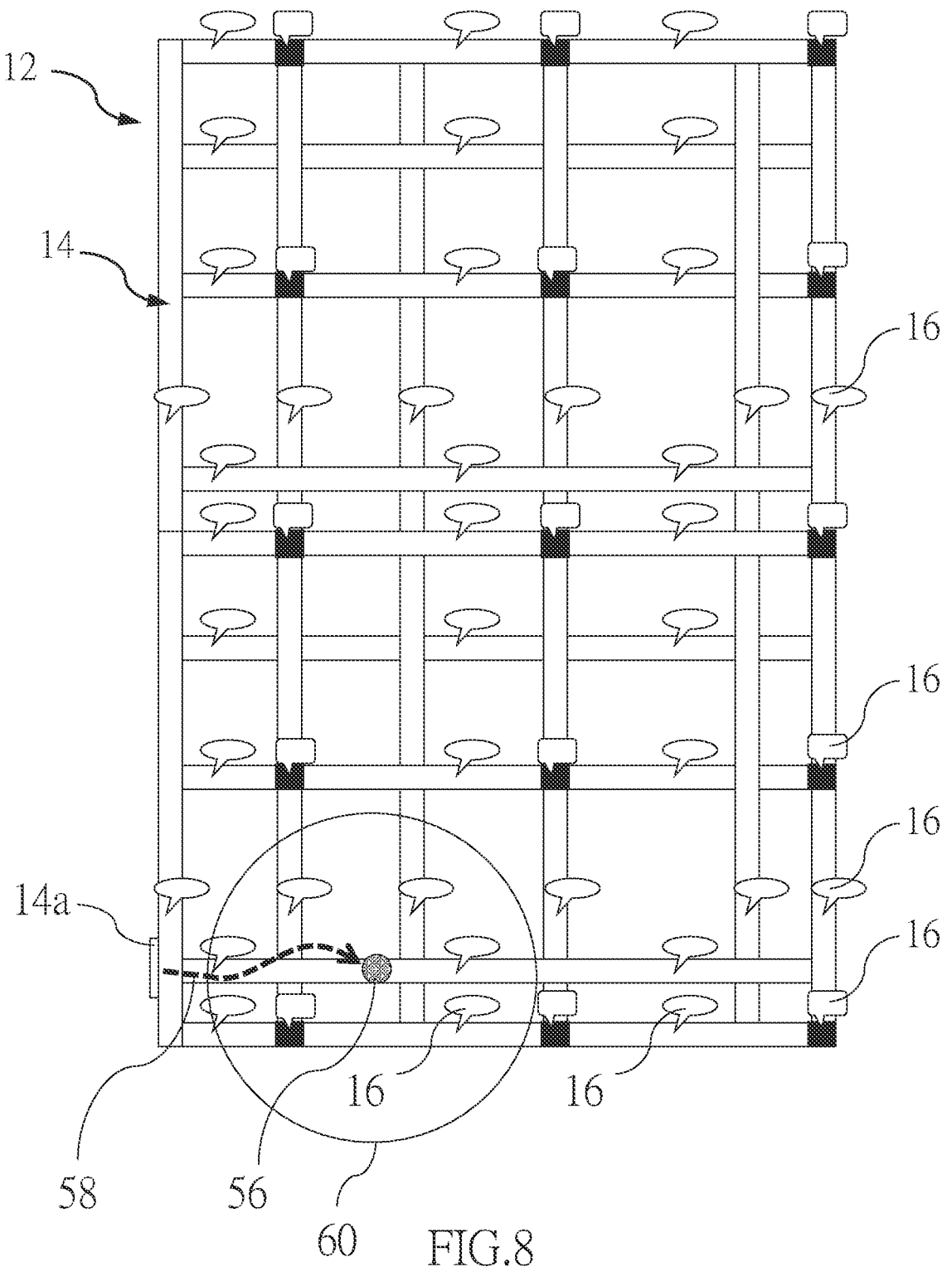
FIG. 8 is a schematic view of the inspection floor page displayed on the screen according to the second embodiment of the present invention, showing the movement track and the predetermined range.

As shown in FIG. 8, after the mobile device 30 acquires the positioning data, the mobile device 30 moves the positioning point 56 on the floor plan 14 of the inspection floor page 12 displayed on the screen 32 based on the positioning data. In other words, when the mobile device 30 moves, the positioning point 56 displayed on the floor plan 14 of the inspection floor page 12 moves accordingly. Besides, the mobile device 30 generates a movement track 58 based on the positioning data continuously acquired and displays the movement track 58 on the floor plan 14 on the mobile device 30, so that the user could clearly understand the current location and movement tracks, thereby facilitating real-time comparison with the construction site.

In the current embodiment, when the user selects any one of the building component link points 16 of the inspection floor page 12 displayed on the screen 32, the mobile device 30 determines whether the selected building component link points 16 falls within a predetermined range 60 (shown in FIG. 8) around the positioning point 56. For example, the predetermined range 60 could be a range with a radius between 2 meters and 5 meters around the positioning point 56.

When the mobile device 30 determines that a position of the selected building component link point 16 is located within the predetermined range 60 around the positioning point 56, the mobile device 30 generates and sends a request command to the server 20 to request that the server 20 sends the configuration data corresponding to the selected building component link point 16 to the mobile device 30. Then, when the server 20 receives the request command, the configuration data corresponding to the building component link point 16 is sent by the server 20 to the mobile device 30 to be displayed on the screen 32.

When the mobile device 30 determines that the position of the selected building component link point 16 is located out of the predetermined range 60 around the positioning point 56, the mobile device 30 generates a prompt message instead of generating and sending the request command to the server 20. The mobile device 30 displays the prompt message on the screen 32. The prompt message could be, for example, "Building component link point is out of the predetermined range". In other words, when the user selects one of the building component link points 16 located out of the predetermined range 60, the configuration data corresponding to the building component link point 16 would not be displayed on the screen 32.

In this way, the user is avoided from inadvertently selecting the building component link points 16 that are located out of the predetermined range 60.

Figure 9:
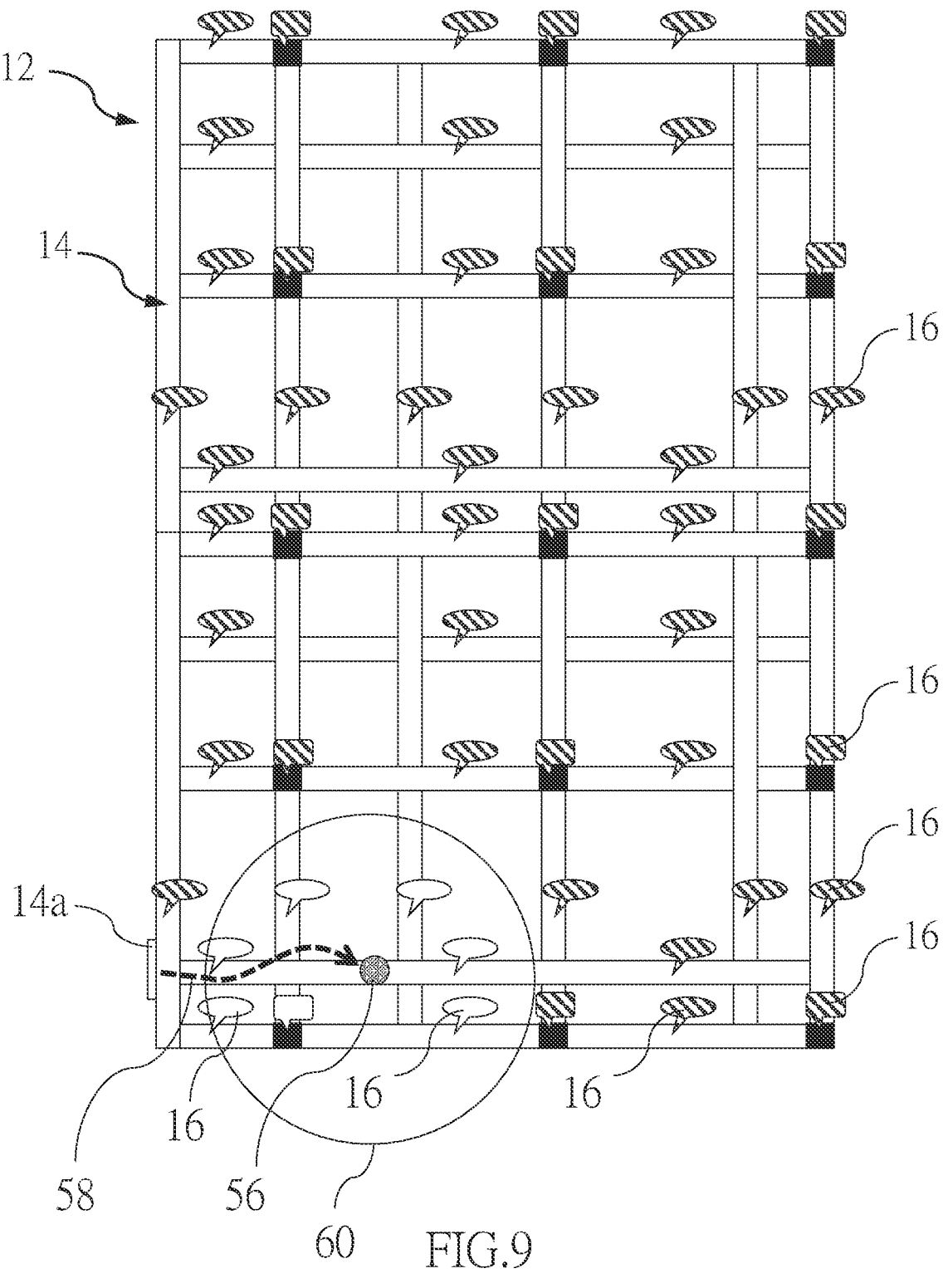
FIG. 9 is a schematic view of the inspection floor page displayed on the screen according to a third embodiment of the present invention.
Figure 10:
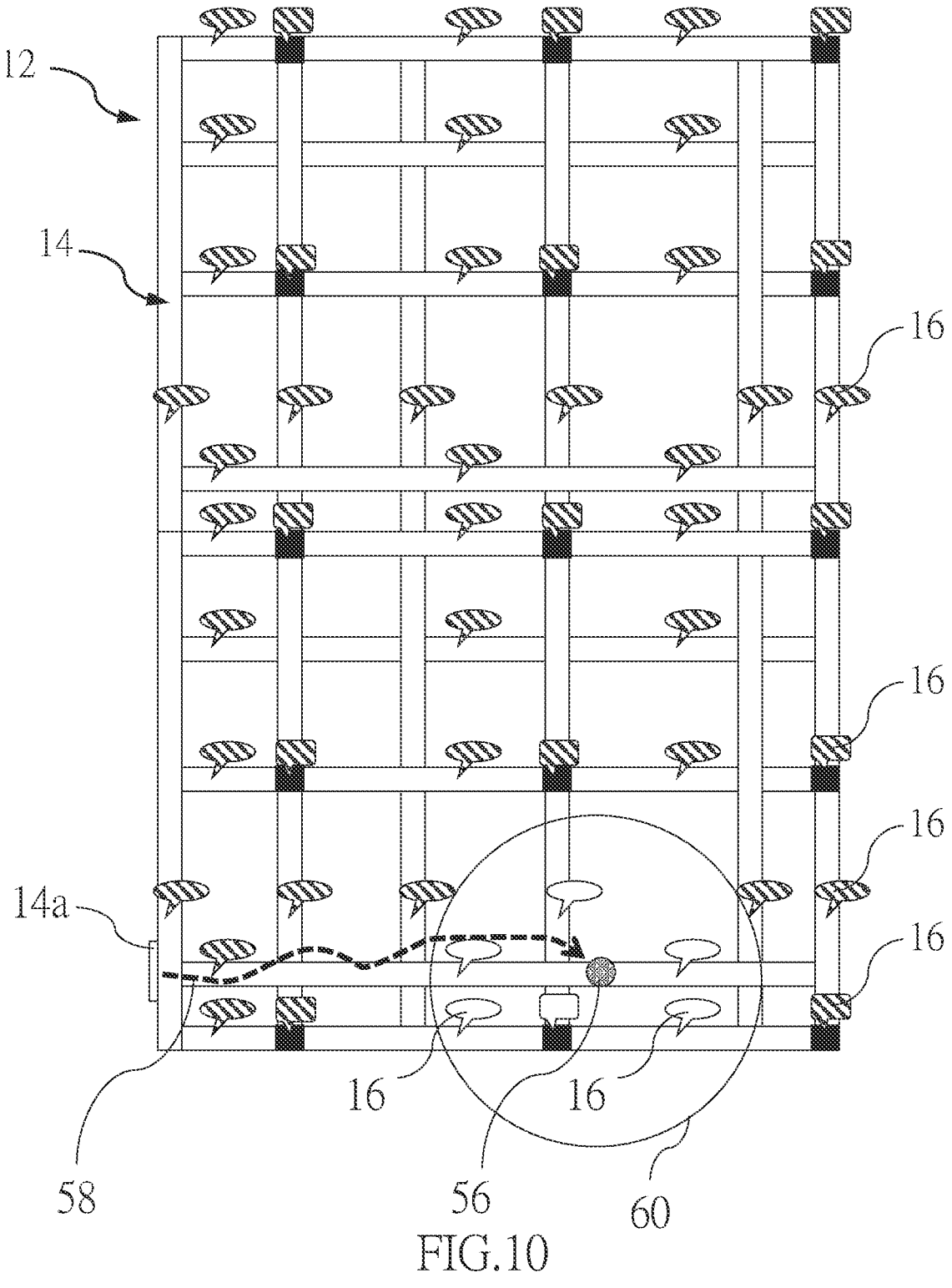
FIG. 10 is a schematic view of the inspection floor page displayed on the screen according to the third embodiment of the present invention, showing the building component link points located within the predetermined range being enabled.

As shown in FIG. 9, an inspection system for building components of building structures and an inspection method for building components of building structures according to a third embodiment of the present invention are almost the same as that of the second embodiment, except that the mobile device 30 enables one or more of plurality of the building component link points 16 of the inspection floor page 12 located within the predetermined range 60 around the positioning point 56, so that the user could select one or more of the plurality of the building component link points 16 located within the predetermined range 60; the mobile device 30 disables one or more of the plurality of the building component link points 16 located out of the predetermined range 60 around the positioning point 56, so that the user could not select one or more of the plurality of building component link points 16 located out of the predetermined range 60. Referring to FIG. 10, as the user moves, the mobile device 30 continuously updates a position of the positioning point 56, continuously enables the building component link points 16 located within the predetermined range 60 around the positioning point 56, and continuously disables the building component link points 16 located out of the predetermined range 60, so that the user could be continuously prevented from inadvertently selecting the building component link points 16 located out of the predetermined range 60.

Figure 11:
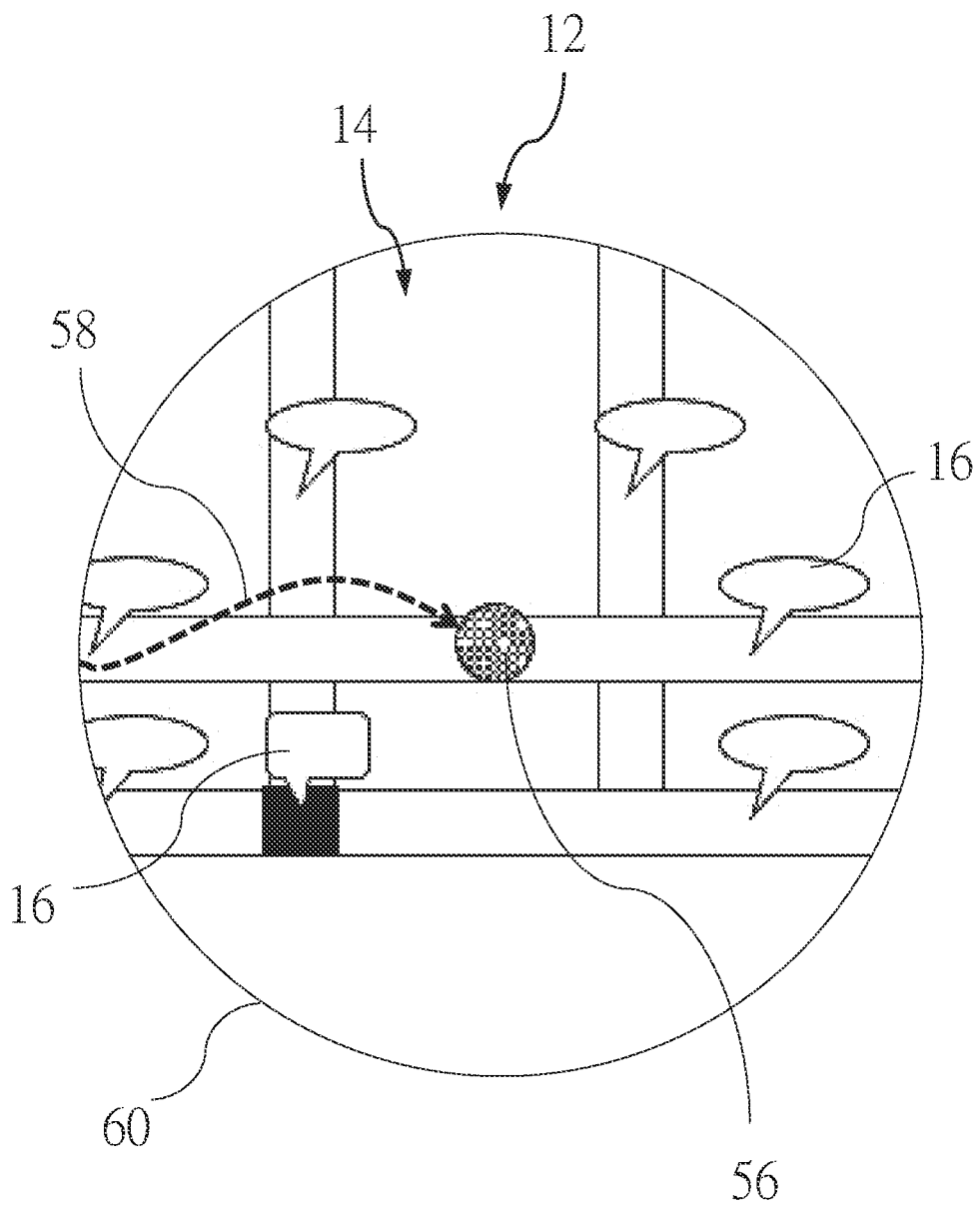
FIG. 11 is a schematic view of the predetermined range of the inspection floor page displayed on the screen according to a fourth embodiment of the present invention.

As shown in FIG. 11, an inspection system for building components of building structures and an inspection method for building components of building structures according to a fourth embodiment of the present invention are almost the same as that of the second embodiment, except that when the user selects the positioning point 56 on the screen 32, the mobile device 30 zooms in and displays the inspection floor page 12 within the predetermined range 60 around the positioning point 56 on the screen 32 to show the floor plan 14 and one or more of building component link points 16 located within the predetermined range 60. In this way, the user could only view the building component link points 16 near the positioning point 56 on the screen 32, thereby facilitating the comparison between the floor plan 14 and the actual floor at the construction site and avoiding the user from inadvertently selecting the building component link points 16 located out of the predetermined range 60.

Figure 12:
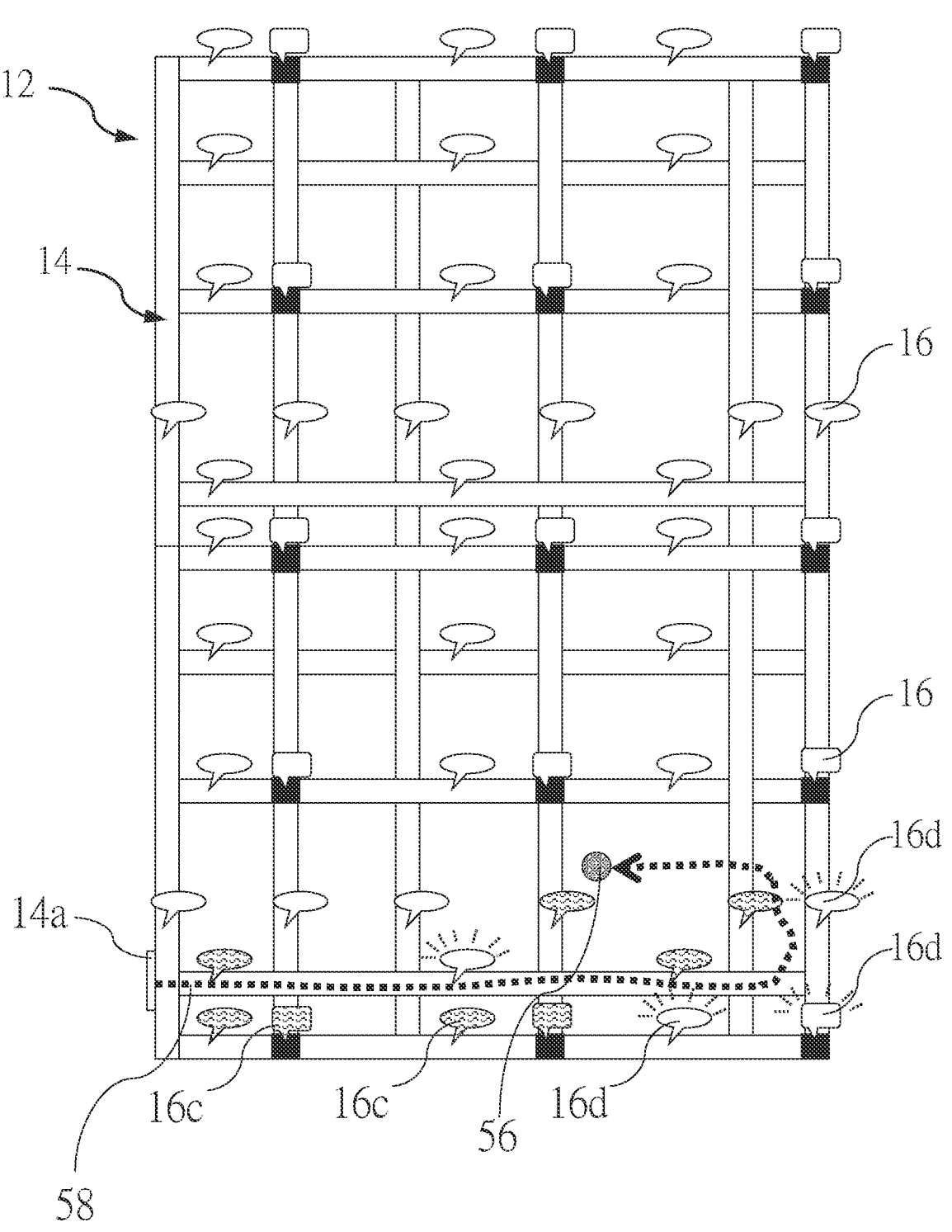
FIG. 12 is a schematic view of the inspection floor page displayed on the screen according to a fifth embodiment of the present invention.

As shown in FIG. 12, an inspection system for building components of building structures and an inspection method for building components of building structures according to a fifth embodiment of the present invention are almost the same as that of the second embodiment, except that the mobile device 30 records building component link points 16c that have been selected by the user and displays the building component like pints 16c previously selected differently on the screen 32, such as using different patterns or colors. The mobile device 30 generates the movement track 58 based on the continuously acquired positioning data, and when the mobile device 30 determines that building component link points 16d, which have not been selected, are provided around the movement track 58, the mobile device 30 generates another prompt message. For example, when a straight-line distance between the movement track 58 and one of the building component link points 16d unselected is less than a predetermined distance, the unselected building component link points 16d are displayed differently; the predetermined distance could be, for example, from 1 meter to 2 meters. The another prompt message could be the unselected building component link point 16d displayed prominently; for example, the unselected building component link point 16d could be displayed with a flicker effect, optionally accompanied by textual prompts, such as displaying "Uninspected" on the unselected building component link point 16d. In this way, the user is reminded that there are still uninspected building component link points 16d around the movement track 58.

With the aforementioned design, the inspection system and the inspection method for the building components of the building structures of the present invention could be more convenient for users to perform the inspection of the building components of the building structures, thereby effectively streamlining the inspection process for the building components. It is worth mentioning that the accuracy of inspection results is enhanced in conjunction with the mobile device positioning technology.

It must be pointed out that the embodiments described above are only some preferred embodiments of the present invention. All equivalent structures which employ the concepts disclosed in this specification and the appended claims should fall within the scope of the present invention.

What is claimed is:

1. An inspection system for building components of building structures, comprising:

a digital environment integration platform storing a plurality of inspection floor pages of at least one building structure, wherein each of the plurality of inspection floor pages has a floor plan and a plurality of building component link points; each of the plurality of building component link points is configured to be linked to configuration data of a building component and an inspection form corresponding to the building component;

a server connected to the digital environment integration platform; and a mobile device connected to the server and having a screen;

wherein the mobile device sends a floor selection command corresponding to one of plurality of the inspection floor pages to the server; the server acquires the corresponding inspection floor page from the digital environment integration platform based on the floor selection command, and sends the corresponding inspection floor page to the mobile device; the mobile device displays the inspection floor page received on the screen;

wherein when a user selects any one of the plurality of building component link points of the inspection floor page displayed on the screen, the server sends the configuration data corresponding to the building component link point to the mobile device, so that the configuration data corresponding to the building component link point is displayed on the screen of the mobile device; the mobile device is linked to the inspection form corresponding to the building component link point to edit the inspection form;

wherein the mobile device has a positioning module configured to acquire positioning data continuously; the mobile device displays a positioning point corresponding to the mobile device on the floor plan of the inspection floor page displayed on the screen based on the positioning data; the mobile device continuously updates a position of the positioning point on the floor plan of the inspection floor page displayed on the screen based on the positioning data continuously acquired, so that the positioning point on the floor plan of the inspection floor page moves with the mobile device;

wherein the mobile device, based on the position of the positioning point continuously updated, zooms in and displays the inspection floor page located within a predetermined range around the positioning point on the screen to display the floor plan and one or more of the plurality of building component link points located within the predetermined range, without displaying the building component link points located outside the predetermined range; and wherein the mobile device, based on the position of the positioning point continuously updated, continuously enables one or more of the plurality of building component link points located within the predetermined range around the positioning point, to allow the user to select the one or more of the plurality of the building component link points located within the predetermined range; and continuously disables one or more of the plurality of building component link points located out of the predetermined range around the positioning point, to prevent the user from selecting the one or more of the plurality of building component link points located out of the predetermined range.

2. The inspection system for the building components of the building structures as claimed in claim 1, further comprising a plurality of two-dimensional codes, wherein a content of each of the plurality of two-dimensional codes is configured to be linked to the server; the mobile device has a camera module and acquires the content of any one of the plurality of two-dimensional codes through the camera module to be connected to the server.

3. The inspection system for the building components of the building structures as claimed in claim 2, wherein the content of each of the plurality of two-dimensional codes further corresponds to one of plurality of the inspection floor pages; the server has a corresponding relationship between the content of each of the plurality of two-dimensional codes and each of the plurality of inspection floor pages; the mobile device acquires the content of any one of the plurality of two-dimensional codes through the camera module, and the content of the two-dimensional code forms the floor selection command; the server acquires the corresponding inspection floor page from the digital environment integration platform based on the content of the two-dimensional code received and the corresponding relationship.

4. The inspection system for the building components of the building structures as claimed in claim 2, wherein the plurality of two-dimensional codes are respectively provided at entrances of one of a plurality of floors of the at least one building structure; after the mobile device acquires the corresponding inspection floor page, the mobile device displays the positioning point corresponding to the mobile device at an entrance on the floor plan of the inspection floor page displayed on the screen.

5. The inspection system for the building components of the building structures as claimed in claim 1, wherein the mobile device records the plurality of building component link points that have been selected by the user; the mobile device generates a movement track based on the positioning data continuously acquired; when the mobile device determines that the plurality of building component link points, which have not been selected, are provided around the movement track, the mobile device generates a prompt message.

6. The inspection system for the building components of the building structures as claimed in claim 1, wherein the mobile device has user data; when the mobile device edits the inspection form, the user data is automatically inputted into the inspection form.

7. An inspection method for building components of building structures, comprising steps of:

providing a digital environment integration platform which stores a plurality of inspection floor pages of at least one building structure, wherein each of the plurality of inspection floor pages has a floor plan and a plurality of building component link points; each of the plurality of building component link points is configured to be linked to configuration data of a building component and an inspection form corresponding to the building component; the digital environment integration platform is connected to a server;

establishing a connection between a mobile device and the server;

sending a floor selection command to the server through the mobile device, wherein the floor selection command corresponds to one of the plurality of inspection floor pages;

acquiring the corresponding inspection floor page from the digital environment integration platform by the server based on the floor selection command and sending the corresponding inspection floor page to the mobile device by the server; displaying, by the mobile device, the inspection floor page received by the mobile device on a screen of the mobile device; and sending the configuration data corresponding to one of the plurality of building component link points to the mobile device by the server when a user selects the building component link point of the inspection floor page displayed on the screen, so that the configuration data corresponding to the building component link point selected is displayed on the screen of the mobile device, and the mobile device is linked to the inspection form corresponding to the building component link point to edit the inspection form;

acquiring positioning data continuously through a positioning module by the mobile device;

displaying a positioning point corresponding to the mobile device on the floor plan of the inspection floor page displayed on the screen by the mobile device based on the positioning data;

updating, continuously, a position of the positioning point on the floor plan of the inspection floor page displayed on the screen by the mobile device based on the positioning data continuously acquired, so that the positioning point on the floor plan of the inspection floor page moves with the mobile device;

zooming in and displaying the inspection floor page located within a predetermined range around the positioning point on the screen by the mobile device based on the position of the positioning point continuously updated to display the floor plan and one or more of the plurality of building component link points located within the predetermined range, without displaying the building component link points located outside the predetermined range; and continuously enabling, by the mobile device based on the position of the positioning point continuously updated, one or more of the plurality of building component link points of the inspection floor page located within the predetermined range around the positioning point, to allow the user to select the one or more of the plurality of the building component link points located within the predetermined range; and continuously disabling, by the mobile device based on the position of the positioning point continuously updated, one or more of the plurality of building component link points located out of the predetermined range around the positioning point, to prevent the user from selecting the one or more of the plurality of building component link points located out of the predetermined range.

8. The inspection method for the building components of the building structures as claimed in claim 7, further comprising providing a plurality of two-dimensional codes, wherein a content of each of the plurality of two-dimensional codes is configured to be linked to the server;

wherein the mobile device acquires the content of any one of the plurality of two-dimensional codes through a camera module to be connected to the server.

9. The inspection method for the building components of the building structures as claimed in claim 8, wherein the content of each of the plurality of two-dimensional codes further corresponds to one of the plurality of inspection floor pages; the server has a corresponding relationship between the content of each of the plurality of two-dimensional codes and each of the plurality of inspection floor pages; the mobile device acquires the content of any one of the plurality of two-dimensional codes through the camera module, and the content of the two-dimensional code forms the floor selection command; the server acquires the corresponding inspection floor page from the digital environment integration platform based on the content of the two-dimensional code received and the corresponding relationship.

10. The inspection method for the building components of the building structures as claimed in claim 8, further comprising:

providing the plurality of two-dimensional codes respectively at entrances of a plurality of floors of the at least one building structure;

displaying, by the mobile device, the positioning point corresponding to the mobile device at an entrance on the floor plan of the inspection floor page displayed on the screen after the mobile device acquires the corresponding inspection floor page.

11. The inspection method for the building components of the building structures as claimed in claim 7, further comprising:

recording, by the mobile device, the plurality of building component link points that have been selected by the user; and generating, by the mobile device, a movement track based on the positioning data continuously acquired by the mobile device, and generating a prompt message by the mobile device when the mobile device determines the plurality of building component link points, which have not been selected, are provided around the movement track.

12. The inspection method for the building components of the building structures as claimed in claim 7, wherein the mobile device has user data; when the mobile device edits the inspection form, the user data is automatically inputted into the inspection form.

* * * * *